(12) United States Patent
Choe et al.

(10) Patent No.: US 9,347,507 B2
(45) Date of Patent: May 24, 2016

(54) ELECTRONIC PARKING BRAKE SYSTEM AND METHOD OF CONTROLLING THE SAME

(71) Applicant: MANDO CORPORATION, Pyeongtaek-si, Gyeonggi-do (KR)

(72) Inventors: Jin Yeong Choe, Seongnam-si (KR); Dong-Il Chang, Yongin-si (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 14/745,013

(22) Filed: Jun. 19, 2015

(65) Prior Publication Data

US 2015/0369317 A1    Dec. 24, 2015

(30) Foreign Application Priority Data

Jun. 20, 2014    (KR) .......................... 10-2014-0075636

(51) Int. Cl.
| | | |
|---|---|---|
| *G06F 7/70* | (2006.01) | |
| *F16D 65/18* | (2006.01) | |
| *F16D 55/225* | (2006.01) | |
| *F16D 66/00* | (2006.01) | |
| *F16D 121/24* | (2012.01) | |

(52) U.S. Cl.
CPC .............. *F16D 65/18* (2013.01); *F16D 55/225* (2013.01); *F16D 66/00* (2013.01); *F16D 2066/006* (2013.01); *F16D 2121/24* (2013.01)

(58) Field of Classification Search
CPC ........ F16D 55/225; F16D 65/18; F16D 66/00
USPC .............................. 701/70; 188/156, 158, 171
See application file for complete search history.

(56) References Cited

U.S. PATENT DOCUMENTS

| | | | | |
|---|---|---|---|---|
| 6,868,323 | B2 * | 3/2005 | Kichima ............ | B60K 31/0008 188/156 |
| 2011/0024243 | A1 * | 2/2011 | Choi ..................... | B60T 11/046 188/158 |
| 2011/0073423 | A1 * | 3/2011 | Moon ..................... | B60T 8/174 188/2 D |
| 2015/0166032 | A1 * | 6/2015 | No ........................ | B60T 13/746 188/162 |

FOREIGN PATENT DOCUMENTS

| | | |
|---|---|---|
| JP | 2007-203821 A | 8/2007 |
| JP | 2012-011877 A | 1/2012 |

* cited by examiner

*Primary Examiner* — Luke Huynh
(74) *Attorney, Agent, or Firm* — McDermott Will & Emery LLP (57) ABSTRACT

Disclosed herein are an electronic parking brake (EPB) system and a method of controlling the same. The EPB system including an EPB actuator which has a motor and provides disc brakes provided in wheels with parking brake power includes a parking switch configured to be turned on or off by a driver, a current detector configured to detect a motor current flowing through the motor of the EPB actuator, a motor driving unit configured to drive the motor of the EPB actuator, and an electronic control unit which applies a parking brake in which the motor of the EPB actuator is rotated by the motor driving unit in one direction to provide the disc brakes with the parking brake power when the parking switch is turned on, calculates an impedance of the motor when a motor current value detected by the current detector is higher than a preset value while applying the parking brake, and determines whether a motor stuck failure occurs based on the calculated impedance of the motor.

10 Claims, 7 Drawing Sheets

ELECTRONIC PARKING BRAKE SYSTEM AND METHOD OF CONTROLLING THE SAME

CROSS-REFERENCE TO RELATED APPLICATION

This application claims the benefit of Korean Patent Application No. 10-2014-0075636, filed on Jun. 20, 2014 in the Korean Intellectual Property Office, the disclosure of which is incorporated herein by reference.

BACKGROUND

1. Field

Embodiments of the present invention relate to an electronic parking brake system and a method of controlling the same, and more particularly, to an electronic parking brake system which controls the applying or releasing of an electronic parking brake and a method of controlling the system.

2. Description of the Related Art

Recently, electronic parking brake (EPB) systems which electronically control an operation of a parking brake are used, each of which is mounted on a general disc brake and performs a function of a parking brake.

In the case of electronic parking brake systems, even when a driver does not manually apply a parking brake, the parking brake may be automatically applied or released depending on the control determination of an electronic control unit which simply operates a switch or performs overall control.

Such electronic parking brake systems each include an EPB actuator including a motor which generates braking power and an electronic control unit for driving the EPB actuator.

The electronic control unit applies or releases the parking brake by driving the EPB actuator depending on an operation state of a switch.

EPB systems which generate parking brake power using the power of a motor determine an amount of force applied to calipers according to an amount of current generated at the motor.

When an amount of current generated while applying the parking brake is a preset value or more, it is determined that parking is completed.

When the applying of the parking brake is performed in a state in which mechanical insertion of a motor occurs, the motor cannot be driven. This phenomenon is called motor stuck.

When the motor stuck occurs, there is no actual amount of force applied to calipers but an amount of current is relatively highly generated. Here, the current is called a stall current.

Accordingly, since it is generally determined using an amount of current generated at a motor that the applying of the parking brake is completed, a stall current threshold value may also be lower than a target current range. However, when the stall current threshold value falls within the target current range, even when a motor stuck failure occurs, it may be incorrectly determined that the applying of the parking brake is normally completed.

SUMMARY

Therefore, it is an aspect of the present invention to provide an electronic parking brake system which more precisely and reliably determines whether a motor stuck failure occurs using a motor current of an electronic parking brake (EPB) actuator and a motor moving state and a method of controlling the system.

Additional aspects of the invention will be set forth in part in the description which follows and, in part, will be obvious from the description, or may be learned by practice of the invention.

In accordance with one aspect of the present invention, an electronic parking brake (EPB) system including an EPB actuator which has a motor and provides disc brakes provided in wheels with parking brake power by rotating the motor includes a parking switch turned on or off by a driver, a current detector configured to detect a motor current flowing through the motor of the EPB actuator, a motor driving unit configured to drive the motor of the EPB actuator, and an electronic control unit which applies a parking brake in which the motor of the EPB actuator is rotated by the motor driving unit in one direction to provide the disc brakes with the parking brake power when the parking switch is turned on, calculates an impedance of the motor when a motor current value detected by the current detector is higher than a preset value while applying the parking brake, and determines whether a motor stuck failure occurs based on the calculated impedance of the motor.

The electronic control unit may determine whether a motor current change rate is a preset change rate or more when the motor current value detected by the current detector is higher than the preset value and may calculate the impedance of the motor when the motor current change rate is the preset change rate or more.

The electronic control unit may determine that the motor stuck failure occurs when the calculated impedance of the motor is lower than a preset value.

The electronic control unit may calculate the impedance of the motor using a vector sum of a resistance component and an inductive reactance component of the motor.

In accordance with another aspect of the present invention, an EPB system including an EPB actuator which has a motor and provides disc brakes provided in wheels with parking brake power by rotating the motor includes a current detector configured to detect a motor current flowing through the motor of the EPB actuator, a motor driving unit configured to drive the motor of the EPB actuator, and an electronic control unit which applies a parking brake in which the motor of the EPB actuator is rotated by the motor driving unit in one direction to provide the disc brakes with the parking brake power, determines whether the motor is moving based on an impedance of the motor when a motor current value detected by the current detector is higher than a preset value while applying the parking brake, and when the motor is not determined to be moving as a result of the determination, determines that the motor stuck failure occurs.

The electronic control unit may calculate the impedance of the motor when the motor current value detected by the current detector is higher than the preset value while applying the parking brake and may determine that the motor is not determined to be moving when the calculated impedance of the motor is lower than a preset value.

The electronic control unit may calculate the impedance of the motor using a vector sum of a resistance component and an inductive reactance component of the motor.

In accordance with still another aspect of the present invention, a method of controlling an EPB system including an EPB actuator which has a motor and provides disc brakes provided in wheels with parking brake power by rotating the motor includes applying a parking brake in which the motor of the EPB actuator is rotated in one direction to provide the disc brakes with the parking brake power, detecting a current flowing through the motor while applying the parking brake, calculating an impedance of the motor when a detected current value is higher than a preset value, and determining whether a motor stuck failure occurs based on the calculated impedance of the motor.

In the calculating of the impedance of the motor, wherein the calculating of the impedance of the motor comprises determining whether a motor current change rate is a preset change rate or more when the detected current value is higher than the preset value and calculating the impedance of the motor when the motor current change rate is the preset change rate or more.

In accordance with yet another aspect of the present invention, a method of controlling an EPB system including an EPB actuator which has a motor and provides disc brakes provided in wheels with parking brake power by rotating the motor includes applying a parking brake in which the motor of the EPB actuator is rotated in one direction to provide the disc brakes with the parking brake power, detecting a current flowing through the motor while applying the parking brake, calculating an impedance of the motor when a detected current value is higher than a preset value, determining whether the motor is moving based on the impedance of he motor; and determining, when the motor is not determined to be moving as a result of the determination, that a motor stuck failure occurs.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the embodiments of the present invention, examples of which are illustrated in the accompanying drawings, wherein like reference numerals refer to like elements throughout.

Hereinafter, exemplary embodiments of the present invention will be described in detail with reference to the drawings. The embodiments which will be described below are provided as an example to allow one of ordinary skill in the art to fully understand the concept of the present invention. The present invention is not limited to the embodiments described below and may be embodied in other forms. To clearly describe the present invention, parts regardless of description will be omitted in the drawings. In the drawings, a width, length, and thickness of a component may be exaggerated for convenience of description. Throughout the specification, like reference numerals designate like elements.

Electronic parking brake (EPB) systems are divided into a cable puller type, a motor-on-caliper type, and a hydraulic parking brake type depending on operation types thereof. Even when a driver does not manually applies a parking brake, if a vehicle stops or starts moving on a hill and there is a risk of being moved back, the EPB systems automatically operate to maintain a parking state or a stopping state of the vehicle.

Figure 1:
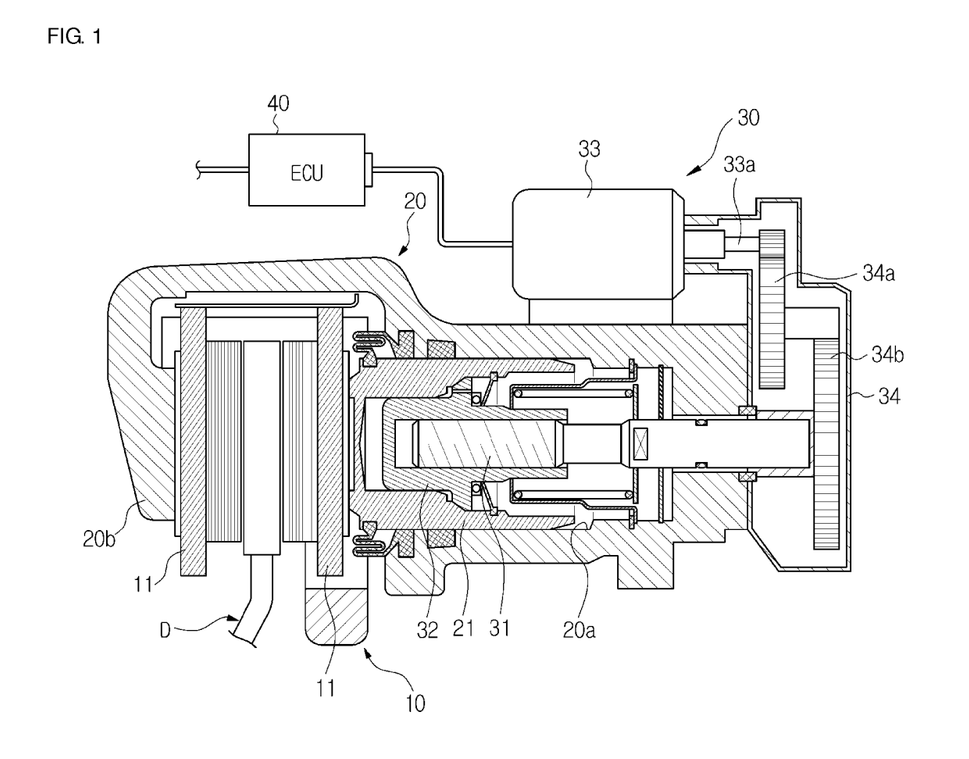
FIG. 1 is a schematic configuration diagram of an electronic parking (EPB) brake system according to one embodiment of the present invention.

FIG. 1 is a schematic configuration diagram of an EPB brake system according to one embodiment of the present invention. In one embodiment of the present invention, a motor-on-caliper type EPB system will be described as an example.

Referring to FIG. 1, the EPB system may include an EPB actuator 30 which generates braking power by operating disc brakes 10 and 20 and an electronic control unit (ECU) 40 which controls an operation of the EPB actuator 30.

The disc brakes 10 and 20 include a carrier 10 which is coupled with a chassis and includes a pair of frictional pads 11 installed therein to be separate with a preset interval and a caliper housing 20 which is installed on the carrier 10 to be movable forward and backward and includes a cylinder portion 20a in which a piston 21 is installed to be movable forward and backward to press the frictional pads 11 using a disc D and a finger portion 20b provided on the other side.

The EPB actuator 30 includes an operating shaft 31 rotatably installed in the cylinder portion 20a of the caliper housing 20, a pressurizing sleeve 32 installed inside the piston 21 to move forward and backward due to the rotation of the operating shaft 31 and to apply pressure to or release pressure from the piston 21, a motor 33 for rotating the operating shaft 31 forward and backward, and a reduction gear assembly 34 which includes a plurality of gears 34a and 34b and transfers power generated at a rotating shaft 33a of the motor 33 to the operating shaft 31 while reducing the number of revolutions.

Figure 2:
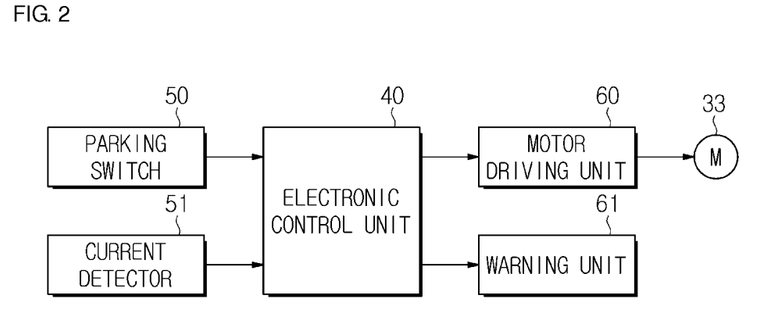
FIG. 2 is a control block diagram of the EPB system according to one embodiment of the present invention.

FIG. 2 is a control block diagram of the EPB system according to one embodiment of the present invention.

Referring to FIG. 2, the EPB system includes the ECU 40 which performs overall control related to the applying of an electronic parking brake.

An input side of the ECU 40 is electrically connected with a parking switch 50 turned on or off by a driver to operate the parking of a vehicle and a current detector 51 which detects a current flowing through the motor 33 of the EPB actuator 30.

An output side of the ECU 40 is electrically connected with a motor driving unit 60 which drives the motor 33 of the EPB actuator 30 and a warning unit 61 which warns the driver of a motor stuck state of the motor 33.

When the parking switch 50 is turned on by the driver, the parking switch 50 transmits a park-applying signal for applying the EPB system to the ECU 40. When the parking switch 50 is turned off by the driver, the parking switch 50 transmits a park-releasing signal for releasing the EPB system to the ECU 40.

That is, depending on an operation state of the parking switch 50, the EPB system shifts into an applied state or a released state.

The current detector 51 detects the current flowing through the motor 33. For example, the current detector 51 may detect a motor current flowing through the motor 33 using a shunt resistor or a hall sensor. Various methods of detecting the motor current may be applied to the current detector 51 in addition to the shunt resistor or the hall sensor. The motor driving unit 60 rotates the motor 33 forward and backward. For example, the motor driver 60 may include an H-bridge circuit formed of a plurality of power switching elements to rotate the motor 33 forward and backward.

The warning unit 61 warns the driver of motor stuck. The warning unit 61 is formed as a visual component such as a warning lamp or an auditory component such as a buzzer installed in a proper place inside the vehicle and warns of the motor stuck failure by operating the warning lamp or the buzzer according to a control signal of the ECU 40. The warning unit 61 may employ a speaker as the auditory component, which may use a speaker of a car audio system provided in the vehicle or may be an additional speaker in a proper place inside the vehicle.

When the park-applying signal is input from the parking switch 50, the ECU 40 applies the parking brake in which the motor 33 of the EPB actuator 30 is rotated in one direction to provide the disc brakes 10 and 20 with parking brake power. When the parking releasing signal is input from the parking switch 50, the ECU releases the parking brake in which the motor 33 of the EPB actuator 30 is rotated in an opposite direction to release the parking brake power applied to the disc brakes 10 and 20.

An operation of the EPB system described above is performed as follows.

First, when the driver turns on the parking switch 50 to park the vehicle, the park-applying signal is input from the parking switch 50 to the ECU 40. When the park-applying signal is input, the ECU 40 rotates the motor 33 of the EPB actuator 30 by the motor driving unit 60 in one direction to provide the disc brakes 10 and 20 with the parking brake power, thereby applying the parking brake.

That is, the ECU 40 rotates the motor 33 of the EPB actuator 30 by the motor driving unit 60 in one direction. The rotation of the motor 33 in one direction is reduced through the reduction gear assembly 34 to rotate the operating shaft 31 in one direction with great power. When the operating shaft 31 is rotated in one direction, the movement of the pressurizing sleeve 32 is performed in an axial direction. When the pressurizing sleeve 32 pressurizes the piston 21, the two frictional pads 11 pressurize the disc D, thereby braking wheels.

Figure 3:
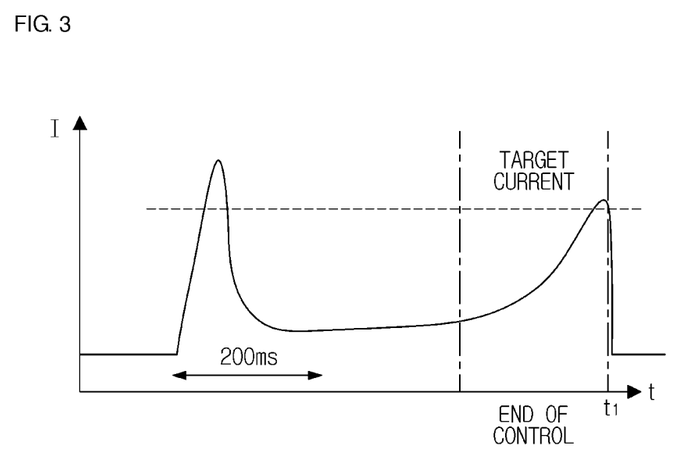
FIG. 3 is a graph illustrating a waveform of motor current when applying the parking brake is normally performed without a motor stuck failure in the EPB system according to one embodiment of the present invention.

As described above, in general, the ECU 40 detects a motor current flowing through the motor 33 through the current detector 51, determines whether the motor current is a target current or more, which is a preset current, and determines that applying the parking brake is completed when the detected motor current is more than the target current, and stops the driving of the motor 33 through the motor driving unit 60. As shown in FIG. 3, when the motor current detected from a point in time when a preset time, for example, 200 ms passes after the driving of the motor 33 starts is a target current or more, it is determined that the applying of the parking brake is completed. That is, when a motor current value generated from a point in time when a preset time passes after applying the parking brake is a target current value or more, it is determined that parking is completed.

Figure 4:
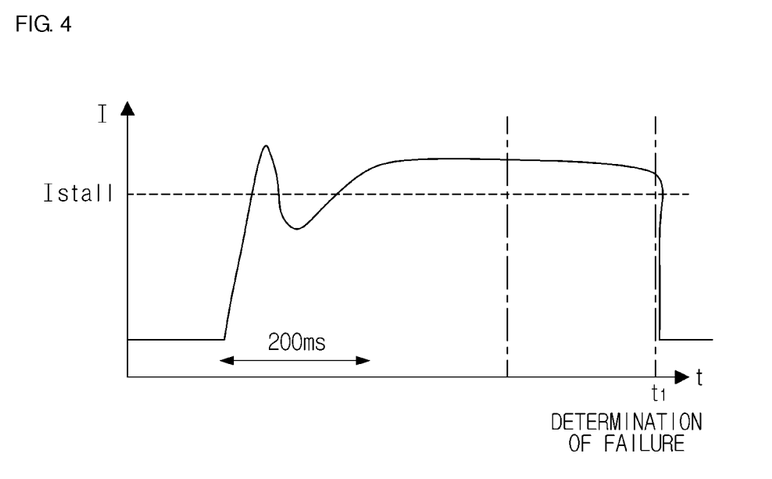
FIG. 4 is a graph illustrating a waveform of a motor current when a motor stuck failure occurs in the EPB system according to one embodiment of the present invention.

As shown in FIG. 4, when a motor current value detected without any no-load section from a point in time when a preset time, for example, 200 ms passes after the driving of the motor 33 starts is detected as a stall current threshold value Istall or more for a preset time, it is determined to be a failure. Here, the stall current threshold value Istall is a threshold value generated when an electric motor starts driving but is not driven by external power.

Figure 5:
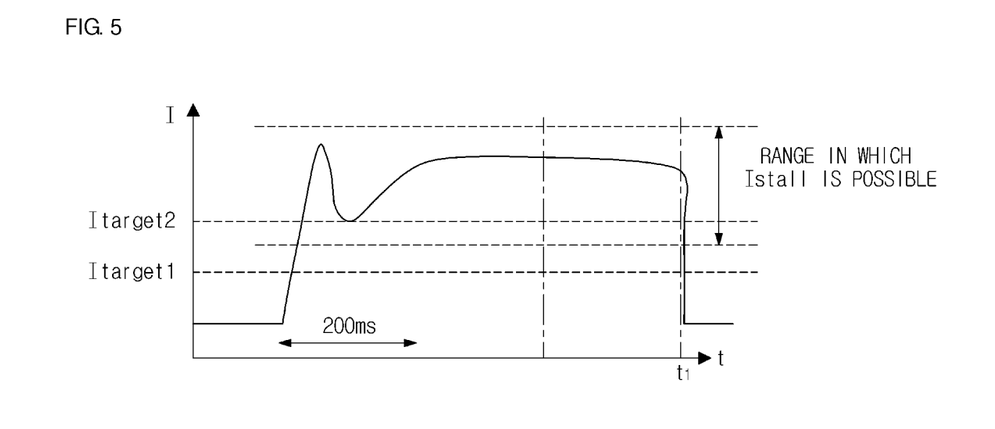
FIG. 5 is a graph illustrating a relationship between a stall current threshold value range possible in the EPB system according to one embodiment of the present invention and a target current.

However, as shown in FIG. 5, when a target current value at a point in time of normal control falls within a range in which a stall current threshold value Istall is possible, it is difficult to distinguish a normal state from a motor stuck failure state.

That is, when the target current value is a first target current value Itarget1, since the first target current value Itarget1 is lower than the range in which the stall current threshold value Istall is possible, it is possible to detect a motor stuck failure. However, when the target current value is a second target current value Itarget2 determined to be greater than the first target current value Itarget1, since the second target current value Itarget2 is included in the range in which the stall current threshold value Istall is possible, it is difficult to distinguish a normal state from a failure state. Accordingly, it may be wrongly determined whether the applying the parking brake is normally completed. That is, it may be impossible to detect the motor stuck failure only through comparing a motor current value with a stall current threshold value.

Accordingly, it is difficult to more precisely and reliably determine whether the motor stuck failure occurs, only through determining whether the motor current value is higher than the stall current threshold value.

According to one embodiment of the present invention, together with determining whether the motor current value is higher than the stall current threshold value, non-behavior of the motor 33 is determined using the impedance of the motor 33. When the motor current value is higher than the stall current threshold value and the motor 33 is not determined to be moving, it is determined to be the motor stuck failure.

Figure 6:
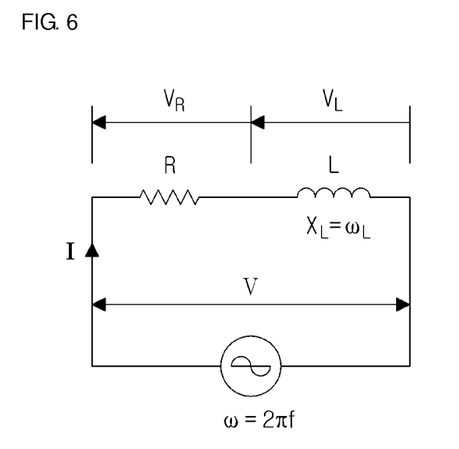
FIG. 6 is a circuit diagram of an equivalent circuit of a motor of an EPB actuator in the EPB system according to one embodiment of the present invention.

FIG. 6 is a circuit diagram of an equivalent circuit of the motor 33 of the EPB actuator 30 in the EPB system according to one embodiment of the present invention.

Referring to FIG. 6, an impedance Z in the equivalent circuit of the motor 33 indicates a ratio of voltage to current in an alternating current (AC) circuit.

In the EPB system, the equivalent circuit of the motor 33 is formed of a resistor-inductor (RL) series circuit and the impedance may be expressed as following Equation [1].

$$Z = R + j\omega L = R + XL(X = j\omega) \quad \text{Equation [1]}$$

Here, R indicates resistance, L indicates inductance, j indicates a complex number, XL indicates inductive reactance, $\omega$ indicates $2\pi f$, and f indicates a power frequency.

Impedance caused by the inductance L is generated only when the motor 33 rotates. In the case of the motor stuck failure in which the motor 33 does not rotate, an inductance component L is removed and only impedance caused by the resistance R is generated. That is, Z=R, and XL=0.

A motor voltage V may be expressed according to Ohm's law as following Equation [2].

$$V = I \cdot Z \quad \text{Equation [2]}$$

Through Equation [2], a motor current change rate ΔI may be obtained using ΔV/ΔZ.

When the motor current change rate increases as a preset value or more, impedance is estimated. When the estimated impedance is maintained to be less than a preset value for a preset time, the motor 33 is not determined to be moving in which the motor 33 does not rotate.

As described above, when the motor 33 is not determined to be moving in which the motor current value is higher than the stall current threshold value and the impedance of the motor 33 is maintained to be less than the preset value for the preset time, it corresponds to a case in which only the motor current value is higher than the stall current threshold value in a state in which the motor 33 does not rotate, which may be determined to be the motor stuck failure.

When only a motor current change is used to determine the motor stuck failure, an effect of voltage fluctuations on current is not reflected. However, when using impedance, since a change in current caused by voltage fluctuations is reflected, it is possible to accurately determine a motor moving state. Due to this, it may be more accurately determined whether the motor 33 is not driven. Accordingly, not only it is possible to detect the motor stuck failure generated during the driving of the motor 33 but also it is possible to more reliably determine whether the motor stuck failure occurs.

Figure 7:
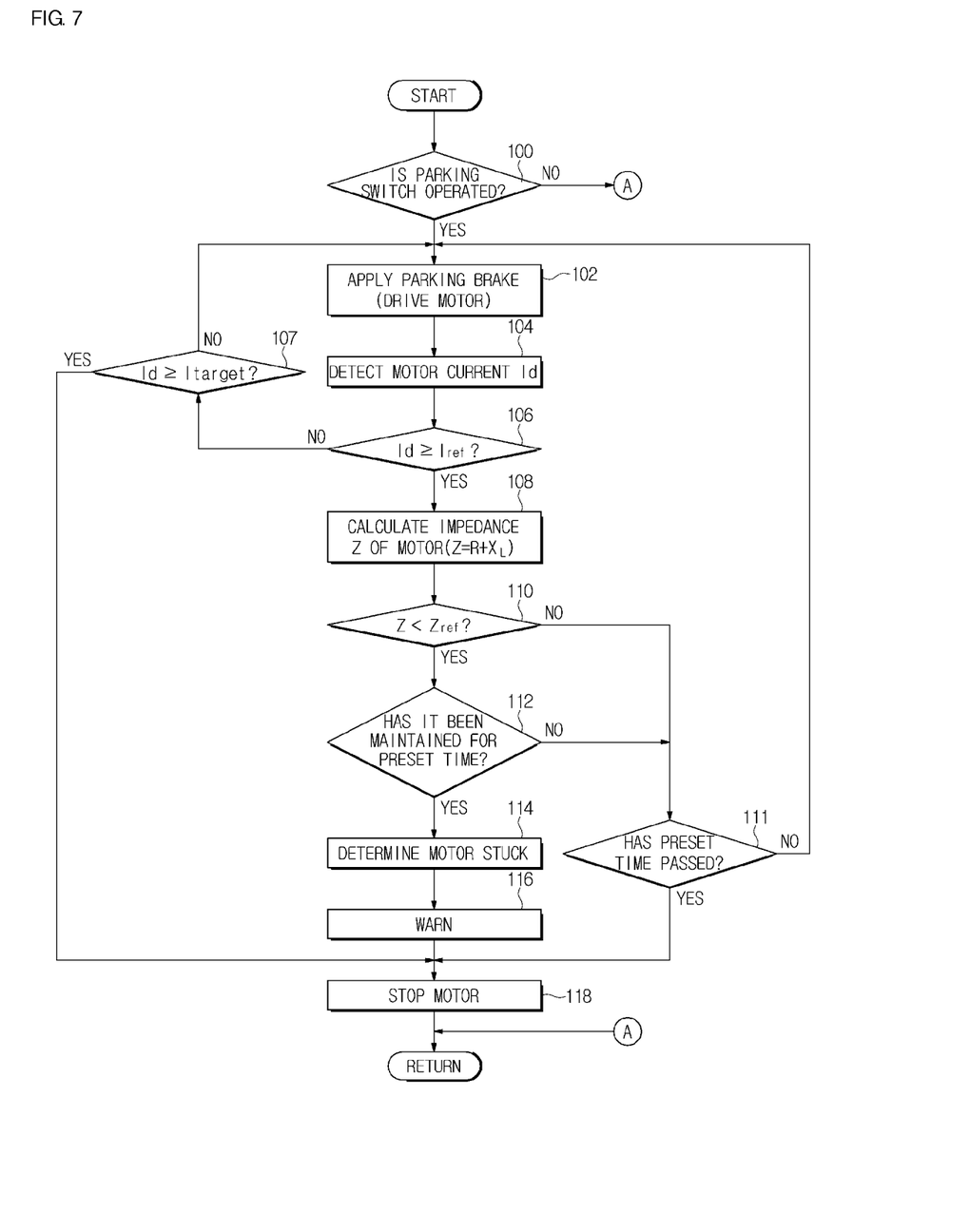
FIG. 7 is a control flowchart illustrating the determining of whether a motor stuck failure occurs in the EPB system according to one embodiment of the present invention.

FIG. 7 is a control flowchart illustrating the determining of whether a motor stuck failure occurs in the EPB system according to one embodiment of the present invention.

Referring to FIG. 7, the ECU 40 determines whether the driver operates the parking switch 50 (S100).

When the parking switch 50 is operated, the ECU 40 rotates the motor 33 of the EPB actuator 30 by the motor driving unit 60 in one direction to operate the disc brakes 10 and 20, thereby applying a parking brake (S102). Here, the rotation of the motor 33 in one direction is reduced in speed through the reduction gear assembly 34 to rotate the operating shaft 31 in one direction with great power. When the operating shaft 31 is rotated in one direction, the movement of the pressurizing sleeve 32 is performed in an axial direction. When the pressurizing sleeve 32 pressurizes the piston 21, the two frictional pads 11 press the wheels to be braked.

Together with applying the parking brake, the ECU 40 detects a motor current Id flowing through the motor 33 through the current detector 51 (S104). Here, the ECU 40 may detect the motor current Id from a point in time when a preset time, for example, 200 ms passes after the driving of the motor 33 starts.

After detecting the motor current Id, the ECU 40 determines whether the detected motor current Id is a preset current Iref or more to determine motor stuck, by comparing the detected motor current Id with the preset current Iref (S106). For example, the preset current Iref may be a stall current threshold value Istall.

As a result of determination in S106, when the detected motor current Id is less than the preset current Iref, it is determined that the detected motor current Id is a target current Itarget or more, which is preset to complete applying the parking brake (S107). As the result of determination in S106, when the detected motor current Id is the target current Itarget or more, the motor 33 is stopped according to completion of applying the parking brake in S110. Meanwhile, as the result of determination in S106, when the detected motor current Id is less than the target current Itarget, operations of S102 and below are performed.

Meanwhile, as the result of determination in S106, when the detected motor current Id is a preset current Iref or more, it is determined that a possibility of the motor stuck failure is high and then an impedance Z of the motor 33 is calculated to determine the non-behavior of the motor 33. In the EPB system, since the equivalent circuit of the motor 33 is formed of an RL series circuit, the impedance Z is calculated using a vector sum of a resistance and an inductive reactance according to Equation 1 ($Z=R+j\omega L=R+XL$).

After that, the ECU 40 determines whether the calculated impedance Z is less than a threshold value Zref for determining the non-behavior of the motor 33 by comparing the calculated impedance Z with the threshold value Zref for determining whether the motor 33 is not moving (S110) and determines whether this state is maintained for a preset time (S112). For example, the threshold value Zref for determining whether the motor 33 is not moving may be a value of a resistance R. Impedance caused by the inductance L is generated only when the motor 33 rotates.

In the case of the motor stuck in which the motor 33 does not rotate, an inductance component L is removed and only impedance caused by the resistance R is generated. That is, $Z=R$, and $XL=0$.

As a result of determination in S110, when the calculated impedance Z is the threshold value Zref or more, which for determining whether the motor 33 is not moving, it is determined whether a preset time passes from a point in time when the detected motor current Id is the preset current Iref or more (S111). As the result of determination in S111, when the preset time passes, applying the parking brake is completed and then the motor 33 is stopped (S118). Meanwhile, as the result of determination in S111, when the preset time does not pass, operations of S102 and below are performed. Meanwhile, even when the calculated impedance Z is less than the threshold value Zref for determining whether the motor 33 is not moving as the result of determination in S110, the state is not maintained for the preset time as the result of determination in S112, operations of S111 and below are performed.

On the other hand, as the result of determination in S112, when a state in which the calculated impedance Z is less than the threshold value Zref for determining whether the motor 33 is not moving is maintained for the preset time, the ECU 40 determines the state to be the motor stuck failure (S114).

Also, the ECU 40 warns the driver of the motor stuck failure through the warning unit 61 (S116) and stops the motor 33 through the motor driving unit 60 (S118).

As is apparent from the above description, according to the embodiments of the present invention, it is possible to precisely and reliably determine whether the motor stuck failure occurs using a motor current of an EPB actuator and a motor moving state, thereby detecting the motor stuck failure. Due to this, it is possible to prevent the malfunction of an EPB system, thereby increasing safety.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electronic parking brake (EPB) system comprising an EPB actuator which has a motor and provides disc brakes provided in wheels with parking brake power by rotating the motor, the EPB system comprising:
   a parking switch turned on or off by a driver;
   a current detector configured to detect a motor current flowing through the motor of the EPB actuator;
   a motor driving unit configured to drive the motor of the EPB actuator; and
   an electronic control unit which applies a parking brake in which the motor of the EPB actuator is rotated by the motor driving unit in one direction to provide the disc brakes with the parking brake power when the parking switch is turned on, calculates an impedance of the motor when a motor current value detected by the current detector is higher than a preset value while applying the parking brake, and determines whether a motor stuck failure occurs based on the calculated impedance of the motor.

2. The EPB system of claim 1, wherein the electronic control unit determines whether a motor current change rate is a preset change rate or more when the motor current value detected by the current detector is higher than the preset value and calculates the impedance of the motor when the motor current change rate is the preset change rate or more.

3. The EPB system of claim 1, wherein the electronic control unit determines that the motor stuck failure occurs when the calculated impedance of the motor is lower than a preset value.

4. The EPB system of claim 1, wherein the electronic control unit calculates the impedance of the motor using a vector sum of a resistance component and an inductive reactance component of the motor.

5. An EPB system comprising an EPB actuator which has a motor and provides disc brakes provided in wheels with parking brake power by rotating the motor, the EPB system comprising:
  a current detector configured to detect a motor current flowing through the motor of the EPB actuator;
  a motor driving unit configured to drive the motor of the EPB actuator; and
  an electronic control unit which applies a parking brake in which the motor of the EPB actuator is rotated by the motor driving unit in one direction to provide the disc brakes with the parking brake power, determines whether the motor is moving based on an impedance of the motor when a motor current value detected by the current detector is higher than a preset value while applying the parking brake, and when the motor is not determined to be moving as a result of the determination, determine that the motor stuck failure occurs.

6. The EPB system of claim 5, wherein the electronic control unit calculates the impedance of the motor when the motor current value detected by the current detector is higher than the preset value while applying the parking brake and determines that the motor is not determined to be moving when the calculated impedance of the motor is lower than a preset value.

7. The EPB system of claim 5, wherein the electronic control unit calculates the impedance of the motor using a vector sum of a resistance component and an inductive reactance component of the motor.

8. A method of controlling an EPB system comprising an EPB actuator which has a motor and provides disc brakes provided in wheels with parking brake power by rotating the motor, the method comprising:
  applying a parking brake in which the motor of the EPB actuator is rotated in one direction to provide the disc brakes with the parking brake power;
  detecting a current flowing through the motor while applying the parking brake;
  calculating an impedance of the motor when a detected current value is higher than a preset value; and
  determining whether a motor stuck failure occurs based on the calculated impedance of the motor.

9. The method of claim 8, wherein the calculating of the impedance of the motor comprises determining whether a motor current change rate is a preset change rate or more when the detected current value is higher than the preset value and calculating the impedance of the motor when the motor current change rate is the preset change rate or more.

10. A method of controlling an EPB system comprising an EPB actuator which has a motor and provides disc brakes provided in wheels with parking brake power by rotating the motor, the method comprising:
  applying a parking brake in which the motor of the EPB actuator is rotated in one direction to provide the disc brakes with the parking brake power;
  detecting a current flowing through the motor while applying the parking brake;
  calculating an impedance of the motor when a detected current value is higher than a preset value;
  determining whether the motor is moving based on the impedance of he motor; and
  determining, when the motor is not determined to be moving as a result of the determination, that a motor stuck failure occurs.

* * * * *